United States Patent [19]
Fetell

[11] Patent Number: 5,877,257
[45] Date of Patent: Mar. 2, 1999

[54] ETHYLENE VINYL ALCOHOL COPOLYMER BLENDS

[75] Inventor: Arthur Irving Fetell, Landenberg, Pa.

[73] Assignee: E. I. du Pont de Nemours and Company, Wilmington, Del.

[21] Appl. No.: 708,472

[22] Filed: Sep. 5, 1996

[51] Int. Cl.$^6$ .............................. C08L 29/04; C08L 23/08
[52] U.S. Cl. ........................... 525/57; 525/166; 525/167
[58] Field of Search .............................. 525/57, 166, 167

[56] References Cited

U.S. PATENT DOCUMENTS

| | | | |
|---|---|---|---|
| 4,764,406 | 8/1988 | Hisazumi et al. | 428/35 |
| 4,952,628 | 8/1990 | Blatz | 525/58 |
| 4,990,562 | 2/1991 | Chou et al. | 525/58 |
| 5,003,002 | 3/1991 | Ofstein | 525/58 |
| 5,064,716 | 11/1991 | Chou et al. | 428/336 |
| 5,110,855 | 5/1992 | Blatz | 525/441 |
| 5,126,401 | 6/1992 | Chou | 525/58 |
| 5,126,402 | 6/1992 | Chou | 525/58 |
| 5,194,306 | 3/1993 | Blatz | 428/354 |
| 5,208,082 | 5/1993 | Chou | 428/36.6 |
| 5,219,929 | 6/1993 | Miyashita et al. | 525/57 |
| 5,280,065 | 1/1994 | Moriyama et al. | 525/57 |
| 5,286,575 | 2/1994 | Chou | 428/474.4 |
| 5,413,845 | 5/1995 | Löfgren | 428/215 |

FOREIGN PATENT DOCUMENTS

| | | |
|---|---|---|
| 0 167 629 A | 1/1986 | European Pat. Off. . |
| 0 467 688 A | 1/1992 | European Pat. Off. . |
| 0 470 486 A1 | 12/1992 | European Pat. Off. . |
| 49 107 351 A | 10/1976 | Japan . |
| 58 000 387 B | 1/1983 | Japan . |
| 6-310239 | 12/1994 | Japan . |
| WO96 18681 | 6/1996 | WIPO . |

OTHER PUBLICATIONS

Kyoraku K. K., Japan et al., Double–layer container resistant to impact and permeation, *Chemical Abstracts*, vol. 99, No. 12, Sep. 19, 1983 (Abstract).

PCT International Search Report dated Feb. 5, 1997, for PCT/US 96/14306 (AD–6410).

*Primary Examiner*—Nathan M. Nutter
*Attorney, Agent, or Firm*—Craig H. Evans

[57] ABSTRACT

A blend of ethylene/vinyl alcohol copolymers with crystalline nylon, and ionomers and optionally amorphous nylon that have a unique balance of properties and to packaging films, laminates, co-extrusions and containers prepared therefrom.

14 Claims, No Drawings

ETHYLENE VINYL ALCOHOL COPOLYMER BLENDS

This application claims the benefit of U.S. Provisional Application No. 60/003,351 filed Sep. 7, 1995.

BACKGROUND OF INVENTION

1. Field of Invention

This invention relates to three and four component blends of ethylene vinyl alcohol copolymers, ionomer, and nylon (semicrystalline nylon in the three-component blend and semicrystalline and amorphous nylon in the four-component blend). These blends have a unique balance of properties and are useful in packaging films, laminates, co-extrusions and containers prepared therefrom. Also, the barrier resins of the present invention can be used as coatings on substrates such as paperboard and can be used in structures that are not multi-layer.

2. Background Discussion and Related Art

Ethylene/vinyl alcohol copolymers (EVOH), particularly those with high levels of vinyl alcohol, exhibit excellent oxygen barrier properties at low humidity. Typically, to provide good barrier properties at high humidities, EVOH is laminated on both sides with polyolefins (see U.S. Pat. No. 3,882,259 which is incorporated herein by reference). U.S. Pat. Nos. 4,952,628; 4,990,562; 5,003,002; 5,064,716; 5,110,855; 5,126,401; 5,126,402; 5,194,306; 5,208,082; and 5,286,575 (all of which are incorporated herein by reference) teach various blends of EVOH and amorphous nylon, and, in some cases, semicrystalline nylon with the amorphous nylon that have barrier properties less dependent on humidity. U.S. Pat. No. 4,082,854 which is incorporated herein by reference suggests a wide variety of polymers that can be blended with EVOH to improve gas permeation characteristics particularly for packaging applications.

In European Patent No. 0 470 486, entitled, "Toughened ethylene (vinyl alcohol) copolymer resins," which is incorporated herein by reference, the EVOH is blended with terpolymers of alpha-olefin, acrylate and either partly neutralized carboxylic acid groups or carbon monoxide. The combination is taught to have a combination of excellent oxygen barrier, toughness and thermoforming characteristics in the form of sheet or film.

It is also known that excellent properties such as gas-barrier, impact resistance, stretchability, drawability and transparency can result from blends of EVOH, ionomer and semicrystalline nylon (see Japanese Patent Application HEI6-310239, filed Dec. 14, 1994, to Kenji Miharu, inventor, which is incorporated herein by reference).

SUMMARY OF INVENTION

This invention provides resin compositions with good gas-barrier properties, in particular properties that provide barrier to oxygen and carbon dioxide. The compositions are three- and four-component blends of ethylene vinyl alcohol (EVOH), ionomer, and polyamide (semicrystalline polyamide, plus, in the four-component blend, amorphous polyamide). The three-component blend employs EVOH, an ionomer with low free acid and high melt flow, low semicrystalline polyamide content, and optionally a metal salt of stearic acid, such as calcium stearate, which is believed to act as an acid scavenger.

Films or laminated structures which incorporate these blends are suitable for use in packaging applications, particularly as a gas barrier layer in multilayer co-extruded, blown, or cast films, cast sheet, laminated structures or coextrusion-blow-molded containers.

DETAILED DESCRIPTION OF INVENTION

One composition of this invention comprises a melt-blend of EVOH, amorphous nylon, semicrystalline nylon, and an ionomer. The components (percentages are weight percentages based on the total weight of the four components) are present in the following amounts:

1. About 40 to about 92%, or about 60 to about 80%, or about 50 to about 75 EVOH resin;
2. About 1 to about 30%, or about 5 to about 25%, or about 10 to about 20%, amorphous polyamide resin;
3. About 2 to about 30%, or about 5 to about 20%, or about 10 to about 15%, semicrystalline polyamide; and
4. About 5 to about 30%, about 10 to about 25%, about 5 to about 15%, ionomer.

Optionally, about 0.1 to 1.0% by weight of the total melt-blend of a hindered phenol antioxidant such as IRGANOX available from Ciba may be included. In another embodiment, the melt blend may optionally contain from 0.05 to 5% by weight of a hindered phenol antioxidant based on total melt-blend. Fillers such as those described in U.S. Pat. No. 4,952,628, particularly Muscovite mica and Phlogopite mica (up to about 20 weight %) with an aspect ratio of 10 to 150 and particle size of smaller than 200 mesh (74 micrometers) may be included. Also, metal salts of long chain ($C_8$ to $C_{10}$ or greater) carboxylic acids, particularly metal salts of stearic acid, more particularly calcium stearate (0.1 to 1.0% by weight, alternatively 0.05 to 5%) can be added.

In another embodiment, the amorphous nylon is excluded from the blend. That is, the blend of this embodiment consists essentially of EVOH, an ionomer with a low free-acid level and relatively high melt flow, a low weight percent semicrystalline nylon (preferably less than 9 weight percent of the polymers in the blend), and optionally a metal salt of stearic acid, preferably calcium stearate, believed to operate as an acid scavenger. This embodiment has been found to provide surprising improvements in thermal stability and adhesion over the three-component blends of Japanese Patent Application HEI6-310239.

The components (percentages are weight percentages based on the total weight of the three components) in this three-component blend are present in the following amounts:

1. About 60 to about 90%, or about 65 to about 85%, or about 70 to about 80% EVOH resin; and
2. About 10 to about 40%, or about 15 to about 35%, or about 20 to about 30%, of a blend of semicrystalline polyamide and ionomer, the ionomer being about 50 to about 90 weight % of the ionomer/polyamide blend, preferably about 75 to about 90 weight % of the blend.

Other components such as the hindered phenol antioxidants, fillers, and metal salts of long-chain carboxylic acids such as discussed above and in levels noted may be used. It is particularly preferred, however, to incorporate about 0.01 to about 3.0, preferably about 0.0 to about 1 weight percent, based on the weight of the polymer components, of a metal salt of a long-chain carboxylic acid, particularly a metal salt of stearic acid, most preferably calcium stearate.

Components of the present invention are discussed below along with the process for making the melt-blends of the present invention.

EVOH

The EVOH resins useful in this invention include resins having a copolymerized ethylene content of about 20 to about 60 mole %, especially about 25 to about 50 mole %. These polymers will have a degree of saponification of at least about 90%, especially at least about 95%. The EVOH copolymer may include as an optional comonomer other olefins such as propylene, butene-1, pentene-1, or 4-methylpentene-1 in such an amount as to not change the inherent properties of the copolymer, that is, usually in an amount of up to about 5 mole % based on total copolymer. The melting points of these EVOH polymers are generally between 160° and 190° C.

The EVOH polymers are normally prepared by a process well known in the art, that is, by copolymerization of ethylene with vinyl acetate, followed by hydrolysis of the vinyl acetate component to give the vinyl alcohol group.

Amorphous Nylon

Amorphous polyamides are well known to those skilled in the art (particularly as selected from among those described in U.S. Pat. Nos. 4,952,628 and 4,990,562). "Amorphous polyamide," as used herein, refers to those polyamides which are lacking in crystallinity as shown by the lack of an endotherm crystalline melting peak in a Differential Scanning Calorimeter ("DSC") measurement (ASTM D-3417), 10° C./minute heating rate.

Examples of amorphous polyamides are those prepared from the following diamines: hexamethylenediamine, 2-methylpentamethylenediamine, 2,2,4- and 2,4,4-trimethylhexamethylenediamine, bis(4-aminocyclohexyl) methane, 2,2-bis(4-aminocyclohexyl)isopropylidine, 1,4- and 1,3 diaminocyclohexane, meta-xylylenediamine, 1,5-diaminopentane, 1,4-diaminobutane, 1,3-diaminopropane, 2-ethyldiaminobutane, 1,4-diaminomethylcyclohexane, p-xylyenediamine, m- and p-phenylenediamine, and alkyl-substituted m- and p-phenylenediamine. These examples are prepared from the following dicarboxylic acids: iso- and tere-phthalic acid, alkyl-substituted iso- and tere-phthalic acid, adipic acid, sebacic acid, butane dicarboxylic acid, and the like.

Specific examples of the amorphous polyamides that can be used include hexamethylenediamine isophthalamide/terephthalamide having iso/terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediamine with iso- or terephthalic acids, or mixtures of these acids. Polyamides based on hexamethylenediamine iso/terephthalamide containing high levels of terephthalic acid moiety may also be useful provided a second diamine such as 2-methyldiaminopentane is incorporated to produce a processible amorphous polymer.

Amorphous polyamides may contain, as comonomers, minor amounts of lactam species such as caprolactam or lauryl lactam, even though polymers based on these monomers alone are not amorphous as long as they do not impart crystallinity to the polyamide. In addition, up to about 10 wt. % of a liquid or solid plasticizer such as glycerol, sorbitol, mannitol, or aromatic sulfonamide compounds (such as "Santicizer 8" from Monsanto) may be included with the amorphous polyamide.

The amorphous polyamide may also be selected from those containing less than about 100 milli-equivalents of terminal carboxyl groups per kilogram of polyamide, as disclosed in U.S. Pat. No. 5,126,402. Preferably, those amorphous polyamides having less than 85 or less than 55 milliequivalents per kilogram may be used.

Semicrystalline Nylon

Semicrystalline polyamides used in the present invention are well known to those skilled in the art. Semicrystalline polyamides suitable for this invention are generally prepared from lactams or amino acids, such as nylon-6 or nylon-11, or from condensation of diamines such as hexamethylene diamine with dibasic acids such as succinic, adipic, or sebacic acid. Copolymers and terpolymers of these polyamides are also included.

Preferred semicrystalline polyamides are polyepsiloncaprolactam (nylon-6), polyhexamethylene adipamide (nylon-66), most preferably nylon-6. Other semicrystalline polyamides useful in the present invention include nylon-11, nylon-12, nylon-12,12 and copolymers and terpolymers such as nylon-6/66, nylon-6/10, nylon-6/12, nylon-66/12, nylon-6/66/610 and nylon-6/6T. In the three-component blend, nylon 6 is the most preferred semicrystalline polyamide.

Ionomer

The ionomers of the present invention are derived from direct copolymers of ethylene and $\alpha,\beta$-ethylenically-unsaturated $C_3$–$C_8$ carboxylic acid ("ethylene-acid copolymers") by neutralization with metal ions. By "direct copolymer", it is meant that the copolymer is made by polymerization of monomers together at the same time, as distinct from a "graft copolymer" where a monomer is attached or polymerized onto an existing polymer chain. Methods of preparing such ionomers are well known and are described in U.S. Pat. No. 3,264,272 which is herein incorporated by reference. Preparation of the direct ethylene-acid copolymers on which the ionomers are based is described in U.S. Pat. No. 4,351,931 which is also incorporated by reference herein.

The ethylene-acid copolymers used to make the ionomeric copolymer of this invention can be E/X(Y copolymers where E is ethylene; X is a softening comonomer and Y is the $\alpha,\beta$-ethylenically-unsaturated $C_3$–$C_8$ carboxylic acid, particularly acrylic or methacrylic acid. Preferably, however, the ethylene-acid copolymer is a dipolymer (no softening comonomer). The preferred acid moieties are methacrylic acid and acrylic acid.

By "softening", it is meant that the polymer is made less crystalline. Suitable "softening" comonomers (X) are monomers selected from alkyl acrylate, and alkyl methacrylate, wherein the alkyl groups have from 1–12 carbon atoms which, when present, may be up to 30 (preferably up to 25, most preferably up to 15) wt. % of the ethylene-acid copolymer.

A wide range of percent acid moiety in the ethylene-acid copolymer may be used. The acid moiety may be present in a range of about 1 to 30 weight percent of the acid copolymer, preferably in a range of about 5 to 25, alternatively about 10 to about 20. The ethylene-acid copolymers with high levels of acid are difficult to prepare in continuous polymerizers because of monomer-polymer phase separation. This difficulty can be avoided however by use of "cosolvent technology" as described in U.S. Pat. No. 5,028,674 which is also incorporated herein by reference or by employing somewhat higher pressures than those at which copolymers with lower acid can be prepared.

The ethylene-acid copolymers are partially neutralized (15 to 75 percent) with metal cations, particularly monovalent and/or bivalent metal cations. Preferably about 25 to about 60 of the acid is neutralized. Preferred metal cations include lithium, sodium, and zinc, or a combination of such cations. Zinc is most preferred.

In the case of the three-component blend, the ionomer has a low free-acid level and preferably has a relatively high melt flow. By "low free-acid level," it is meant that the residual acid after neutralization is less than about 10 weight %, about 7%, preferably less than about 5%. The desired free acid level may be achieved by controlling the acid in the starting ethylene-acid copolymer, preferably to less than about 15%, more preferably 12% or less, and by controlling the percent neutralization to get the desired free acid level. High neutralization, that is neutralization above about 60, should be avoided since it may reduce thermoformability. By "relatively high melt flow," it is meant that the melt flow of the partially-neutralized ethylene/$\alpha,\beta$-ethylenically-unsaturated $C_3-C_8$ carboxylic acid copolymer has a melt flow greater than that taught in Japanese Patent Application HEI6-3 10239, preferably greater than 3, or greater than 5, or more preferably about 10 grams/10 minutes or greater when measured per ASTM D-1238, condition E.

Preferred ethylene-acid dipolymers are ethylene/acrylic acid and ethylene/methacrylic acid. Specific other copolymers include ethylene/n-butyl acrylate/acrylic acid, ethylene/n-butyl acrylate/methacrylic acid, ethylene/iso-butyl acrylate/methacrylic acid, ethylene/iso-butyl acrylate/acrylic acid, ethylene/n-butyl methacrylate/methacrylic acid, ethylene/methyl methacrylate/acrylic acid, ethylene/methyl acrylate/acrylic acid, ethylene/methyl acrylate/methacrylic acid, ethylene/methyl methacrylate/methacrylic acid, and ethylene/n-butyl methacrylate/acrylic acid.

Process

The composition of this invention is preferably made by melt compounding a mixture of the ionomer and the polyamide (amorphous polyamide and semicrystalline polyamide in the four component blend and semicrystalline polyamide alone in the three component blend), and then melt-blending the ionomer/polyamide blend with EVOH. All three or four components, however, could be directly melt-blended together. The order of addition of the polyamide and ionomer is not important. Preferably, however, the polyamide and ionomer are melt blended and then the EVOH is added.

In a preferred embodiment, the polyamide (semicrystalline and, in the four component case, amorphous polyamide) and ionomer are melt blended using conventional equipment such as a Banbury mixer, a single-screw extruder, or a twin-screw extruder at a temperature sufficiently high to melt the ionomer and semicrystalline polyamide components provided that the temperature is also high enough in the four component case for the amorphous polyamide to be softened enough to be processible. Preferably the temperature should be close to the melting point of the highest melting ionomer or semicrystalline polyamide component, so long as in the four component case the amorphous nylon is soft enough at that temperature. The mixture should be processed at a temperature that will enable one to get a homogeneous melt blend at moderate shear. Temperatures of from about 190° to 260° C. or 200° to 230° C. or perhaps even lower temperatures, say 160° to 210° C., can be used.

While the resulting melt-blend can be directly melt blended with EVOH, the melt is preferably extruded into a strand, water cooled and cut into pellets. It is also possible to melt cut the blended material into pellets using known techniques. Preferably, pellets are then cooled. Cooled pellets can then be mixed by tumble-blending with EVOH resin to make a salt and pepper blend, which in turn can be melted and used to form an extruded, cast, or blown film that can be a barrier layer in a multilayer film (up to about 10 mils in total thickness); a cast sheet (from about 10 mils up); a blow-molded container or the like. The barrier layer, typically from 0.1 to 2–5 mils (2.5 to 50–130 micrometers) thick, can be included in a multilayer structure using known techniques and equipment. Preferably the multilayer structure is co-extruded.

EXAMPLES

The objective of these examples is to demonstrate how certain variables interact to affect key properties such as gel formation, processing temperature, haze, oxygen permeation (at high and low relative humidity), thermal stability, toughness, and thermoformability. From the analysis of the data obtained, compositional blends having an outstanding balance of properties are identified. In particular, blends having an outstanding balance of properties not requiring use of 20% acid copolymer resins are identified.

EVOH/SELAR® PA/SURLYN®/Nylon Blends Test Protocol

Employing an "experimental design" protocol known as ECHIP®, a copyrighted product of Echip Inc., a 36-run experimental design (Table 1) consisting of 26 unique trials, 5 replicates and 5 checkpoints was used to evaluate the effects of and interactions between each of the following eight variables:

EVOH Concentration (60–80 wt. %).
SELAR®PA Concentration (0–30 wt. %).
SURLYN® Ionomer Concentration (5–25 wt. %).
Nylon Concentration (5–25 wt. %).
Nylon Type (6 vs. 6,66).
Acid Concentration of SURLYN® Ionomer (10–20 wt %).
Percent Neutralization of SURLYN® Ionomer (25–70%.).
Termonomer in ionomer (yes, no).

The experimental design is known as an "interaction model." Table 3. shows the 23 pairwise interactions evaluated. Specifically identified pairwise interactions demonstrate surprising performance benefits of specific blends.

For the purpose of the examples, a number of factors are kept constant and not varied. Ionomers used in making the barrier resin films were limited to Zn ionomers and the EVOH used was limited to the most widely used grade, one containing 32 mol % ethylene.

The ionomer resins used in making the barrier resin films evaluated are the ones identified in Table 2. Ionomer resins that are not commercially available are identified as Lab Grades and were prepared using well-known technology for producing ionomers.

All formulations containing SELAR®PA, SURLYN® and Nylon (either 6, or 6,6) were melt compounded and pelletized using a twin-screw extruder. All blends were made with 0.5 wt. % IRGANOX 1010 antioxidant.

EVOH pellets were tumble-blended and melt-compounded with the other materials that were melt compounded earlier, the concentrations being as set forth in Table 1, then co-extruded into three-layer films were prepared using the Brampton blown-film line. Three-layer films consisting of a 1.5 mil layer of low density polyethylene (LDPE), a 1.0 mil layer of the Barrier Blend of the composition of this invention, and another 1.5 mil layer of LDPE, without adhesive tie layers, were made. The LDPE layers were then removed to produce the barrier layer samples for testing by themselves in each of the following tests except the one for Thermoformablity (results are reported in Table 4):

OPV (cubic centimeters oxygen passing through a 100 square inch, 1 mil thick sample per day at 1 atmosphere, cc-mil/100 in²-day-atm.) was measured at 23° C. and 80% RH (OPV wet) and at 23° C. and 35% RH (OPV dry) using an OXTRAN Model 1000H 10-head oxygen analyzer, manufactured by Modern Controls, Inc., Minneapolis, Minn., operated in mode 4, following the method of ASTM D 3985. During the test period, probes were recalibrated daily using a PRO-CAL Model 1 R. H. Sensor manufactured by Modern Controls, Inc. (To obtain the cubic centimeters through a 1 square meter, 25 micrometer sample per day per 1 atmosphere, cc-25 µm/m²-day-atm., the cc-mil/100 in²-day-atm. values in the table should be multiplied by 15.5.)

Pinhole Flex Life (cycles to failure) was measured by forming a film sample into an airtight tube, applying air pressure to the inside to the tube, and then alternately flexing and relaxing axially (by a twisting and compressing and then relaxing) until failure occurs (Pin Flex). A machine similar to a Gelbo Flex tester is used.

Total Haze and Internal Haze (Intern Haze) were measured per ASTM D 1003. Total Haze measures the scattering of light from the top and bottom surfaces as well as through the film, while Internal Haze measures only the portion of light scattered in passing through the film. Internal Haze reduction is considered key and is therefore the value reported in the table. Units are percent haze.

Thermoformability (T-form) was measured using a single-station thermoformer. Three-layer film samples were solid-phase pressure formed into a specially-designed 9-cavity mold at a temperature sufficient to soften the polymer, about 150° C.). Each cavity is 1 inch (2.54 cm) in diameter. Each cavity has a different depth, varying by 0.2 inches (0.5 cm) from 0.2 to 1.8 inches (0.5 to 4.6 cm). Each cavity contained 6 vents. For each film sample, the highest depth-of-draw and the thermoform quality were noted. The highest depth of draw was determined as the deepest cavity filled without tearing the three-layer laminate. The thermoform quality (1–10, with 10 being best quality) was subjectively determined based on appearance (clarity, uniformity, EVOH breaks and layer separation causing "orange peel" in the film and striations, etc.) of the film that filled the deepest cavity without tear. The results recorded in the table were obtained by multiplying the deepest draw ratio (depth-of-draw/diameter of cavity) by the thermoform quality rating.

Spencer Impact (joules/millimeter) measured per ASTM D-3420.

Elmendorf Tear (grams/mil) measured in machine direction (MD) and the transverse direction (TD) per ASTM D-1922.

Thermal Stability was evaluated using the following factors:
1. Haake (slope)=Slope of curve (meter-kilograms/minute) measured using a Haake Model 90 Viscometer operated at 250° C., 60 revolutions per minute. Slope equals (Maximum Torque minus Minimum Torque)/Stabil. min. The Slope of the torque/time curve provides the rate of gel formation for the barrier blend being tested.
2. Trq__Max=Maximum torque reached during the one hour test.
3. Stabil, min=Time in minutes to reach maximum torque. This is the time required to reach the "gel point" (where the torque/time curve reaches an inflection point and the torque drops rapidly to very low levels).
4. MI__Stab.=Ratio of melt index (MI) determined for a sample after being held for 30 minutes at 250° C. to the MI of the sample before the 30 minute "cook" time. Employing a melt indexer operated at 230° C. with 2160 gram weight on the plunger the melt index (MI) of the sample is determined at the start of the test. The same test is re-run after the sample has been allowed to sit at the 250° C. temperature for 30 minutes. The ratio of the MI after the thirty-minute cook to the MI at the start is the MI__Stab. reported in the table.

Superior Thermal Stability is indicated by the following:
1. Haake (slope)—lower slope indicates increased stability.
2. Trq__Max—lower maximum torque indicates increased stability.
3. Stabil. min—longer time to reach maximum indicates increased stability.
4. MI__Stab. ratios close to 1 are preferred. Ratios greater than about 0.70 indicate good thermal stability. Ratios greater than 1 (indicating that chain scission has occurred) are not satisfactory.

TABLE 1

Interaction Design for Eight Variables

| # | [EV][1] | [PA][2] | [SU][3] | [NY][4] | Nylon[5] | SURLYN ®[6] |
|---|---|---|---|---|---|---|
| 22 | 0.6 | 0.1 | 0.15 | 0.15 | 6 | 4 |
| 3 | 0.6 | 0 | 0.25 | 0.15 | 6/66 | 6 |
| 10 | 0.7 | 0 | 0.25 | 0.05 | 6 | 2 |
| 5 | 0.8 | 0.1 | 0.05 | 0.05 | 6/66 | 6 |
| 2 | 0.6 | 0.3 | 0.05 | 0.05 | 6/66 | 4 |
| 6 | 0.8 | 0 | 0.15 | 0.05 | 6/66 | 7 |
| 12 | 0.6 | 0.1 | 0.25 | 0.05 | 6 | 5 |
| 4 | 0.7 | 0 | 0.05 | 0.25 | 6/66 | 4 |
| 21 | 0.6 | 0.1 | 0.05 | 0.25 | 6/66 | 8 |
| 14 | 0.6 | 0 | 0.15 | 0.25 | 6/66 | 8 |
| 5 | 0.8 | 0.1 | 0.05 | 0.05 | 6/66 | 6 |
| 25 | 0.7 | 0.2 | 0.05 | 0.05 | 6 | 8 |
| 7 | 0.6 | 0.3 | 0.05 | 0.05 | 6 | 5 |
| 2 | 0.6 | 0.3 | 0.05 | 0.05 | 6/66 | 4 |
| 16 | 0.6 | 0.1 | 0.05 | 0.25 | 6 | 3 |
| 3 | 0.6 | 0 | 0.25 | 0.15 | 6/66 | 6 |
| 23 | 0.7 | 0.2 | 0.05 | 0.05 | 6/66 | 1 |
| 8 | 0.6 | 0 | 0.25 | 0.15 | 6 | 7 |
| 18 | 0.6 | 0 | 0.15 | 0.25 | 6 | 1 |
| 1 | 0.6 | 0.3 | 0.05 | 0.05 | 6 | 2 |
| 1 | 0.6 | 0.3 | 0.05 | 0.05 | 6 | 2 |
| 13 | 0.8 | 0 | 0.05 | 0.15 | 6/66 | 2 |
| 9 | 0.7 | 0 | 0.05 | 0.25 | 6 | 6 |
| 20 | 0.7 | 0 | 0.25 | 0.05 | 6/66 | 3 |
| 15 | 0.6 | 0.1 | 0.05 | 0.25 | 6/66 | 2 |
| 19 | 0.8 | 0 | 0.05 | 0.15 | 6 | 8 |
| 26 | 0.6 | 0 | 0.25 | 0.15 | 6/66 | 1 |
| 24 | 0.68 | 0.06 | 0.13 | 70.13 | 6/66 | 9 |
| 4 | 0.7 | 0 | 0.05 | 0.25 | 6/66 | 4 |
| 11 | 0.8 | 0.1 | 0.05 | 0.05 | 6 | 4 |
| 17 | 0.6 | 0.1 | 0.25 | 0.05 | 6/66 | 4 |
| 27 | 0.7 | 0 | 0.20 | 0.10 | 6 | 10 |
| 28 | 0.7 | 0 | 0.15 | 0.15 | 6 | 5 |
| 29 | 0.7 | 0 | 0.21 | 0.09 | 6 | 11 |
| 30 | 0.7 | 0 | 0.21 | 0.09 | 6 | 5 |
| 31 | 1.0 | 0 | 0 | 0 | — | — |

[1]Concentration of EVOH.
[2]Concentration of SELAR ® PA-3426.
[3]Concentration of Zinc SURLYN ® Ionomer.
[4]Concentration of Nylon
[5]Type of Nylon employed.

TABLE 1-continued

Interaction Design for Eight Variables

| # | [EV]¹ | [PA]² | [SU]³ | [NY]⁴ | Nylon⁵ | SURLYN ®⁶ |
|---|-------|-------|-------|-------|--------|-----------|

⁶See Table 2 for SURLYN® Ionomer identification and other variables considered in the design.

TABLE 2

Identity of Ionomers in Table 1

| No. used in Table 1 | Grade⁷ | % Acid⁸ | % Neut⁹ | % Free Acid | Termonomer |
|---|---|---|---|---|---|
| 1 | 1652 | 9 | 18 | 7.4 | No |
| 2 | Lab Grade | 10 | 28 | 7.2 | 10% i-BA |
| 3 | 9520 | 10 | 71 | 2.9 | No |
| 4 | 9020 | 10 | 73 | 2.7 | 10% i-BA |
| 5 | 9220 | 20 | 34 | 13.2 | No |
| 6 | Lab Grade | 16 | 32 | 10.9 | 10% i-BA |
| 7 | Lab Grade | 19 | 56 | 8.4 | No |
| 8 | Lab Grade | 14 | 62 | 5.3 | 10% i-BA |
| 9 | 9950 | 15 | 23 | 11.6 | No |
| 10 | 9320 | 9 | 50 | 4.5 | 23.5% n-BA |
| 11 | Lab Grade | 20 | 40 | 12.0 | No |

⁷Commercial grade of SURLYN® Ionomer available from E. I. du Pont de Nemours and Company unless indicated as a laboratory grade.
⁸Weight percent methacrylic acid in ionomer
⁹Neutralized with zinc.

TABLE 3

Interactions to be Evaluated

| Term | Factor Effect |
|---|---|
| 0 | CONSTANT |
| 1 | [EVOH] |
| 2 | [PA] |
| 3 | [SU] |
| 4 | [NY] |
| 5 | Su_Ac |
| 6 | Su_Neut |
| 7 | [EVOH]*[PA] |
| 8 | [EVOH]*[SU] |
| 9 | [EVOH]*[NY] |
| 10 | [EVOH]*Su_Ac |
| 11 | [EVOH]*Su_Neut |
| 12 | [PA]*[SU] |
| 13 | [PA]*[NY] |
| 14 | [PA]*Su_Ac |
| 15 | [PA]*Su_Neut |
| 16 | [SU]*[NY] |
| 17 | [SU]*Su_Ac |
| 18 | [SU]*Su_Neut |
| 19 | [NY]*Su_Ac |
| 20 | [NY]*Su_Neut |
| 21 | Su_Ac*Su_Neut |
| 22 | Ny_type[6/66] |
| 23 | Ter-ion[No] |

TABLE 4

Responses

| Trial | Flex | pin T-form | Intern Haze | Haake (slope) | Trq Max | Stab min | MI-Stab. | Spencer Impact | OPV dry | OPV wet | Elmendorf MD | TD |
|---|---|---|---|---|---|---|---|---|---|---|---|---|
| 22 | 3870 | 3.6 | 22.5 | 20.1 | 1294 | 60 | 0.96 | 7.4 | 0.003 | 0.199 | 23.1 | 25.2 |
| 3 | 5705 | 6.0 | 3.87 | 57.5 | 2285 | 38 | 0.59 | 10.2 | 0.009 | 0.221 | 12.9 | 14.9 |
| 5 | 2433 | 4.2 | 14.60 | 16.4 | 1095 | 60 | 1.14 | 2.4 | 0.000 | 0.089 | 12.1 | 13.6 |
| 10 | 3857 | 2.4 | 12.43 | 21.7 | 1347 | 60 | 0.70 | 20.6 | 0.000 | 0.087 | 22.3 | 25.6 |
| 2 | 2264 | 3.0 | 27.20 | 8.3 | 708 | 60 | 0.74 | 1.5 | 0.005 | 0.096 | 15.8 | 19.9 |
| 6 | 2736 | 5.6 | 9.56 | 21.6 | 1316 | 58 | 0.72 | 6.5 | 0.000 | 0.096 | 20.6 | 24.1 |
| 12 | 2521 | 4.8 | 9.5 | 27.4 | 1651 | 60 | 0.16 | 2.0 | 0.003 | 0.133 | 13.5 | 19.5 |
| 4 | 6738 | 5.6 | 1.51 | 52.6 | 1883 | 36 | 0.46 | 22.6 | 0.060 | 0.405 | 28.3 | 33.7 |
| 21 | 4836 | 5.6 | 12.77 | 42.9 | 1796 | 41 | 0.51 | 14.1 | 0.050 | 0.503 | 25.3 | 29.3 |
| 14 | 8446 | 8.0 | 1.46 | 58.5 | 1912 | 33 | 0.68 | 12.5 | 0.078 | 0.790 | 37.4 | 26.3 |
| 5 | 2880 | 6.4 | 14.53 | 15.5 | 940 | 60 | 1.01 | 3.2 | 0.000 | 0.109 | 14.8 | 16.4 |
| 25 | 2177 | 1.2 | 32.37 | 11.6 | 800 | 60 | 1.05 | 2.5 | 0.002 | 0.113 | 16.9 | 20.5 |
| 7 | 2378 | 2.4 | 24.97 | 10.8 | 729 | 60 | 1.04 | 1.5 | 0.002 | 0.135 | 17.3 | 21.2 |
| 2 | 2174 | 1.8 | 34.10 | 10.2 | 666 | 60 | 0.74 | 1.5 | 0.002 | 0.103 | 17.9 | 20.6 |
| 16 | 5065 | 3.2 | 13.53 | 38.7 | 1713 | 42 | 1.04 | 11.4 | 0.032 | 0.403 | 26.1 | 25.1 |
| 3 | 6323 | 8.0 | 4.98 | 59.7 | 2121 | 36 | 0.62 | 5.0 | 0.050 | 0.191 | 12.8 | 16.4 |
| 23 | 2969 | 5.6 | 40.27 | 11.7 | 843 | 60 | 0.93 | 4.2 | 0.010 | 0.104 | 16.4 | 16.9 |
| 8 | 4961 | 6.0 | 6.05 | 16.9 | 1148 | 60 | 0.69 | 2.6 | 0.023 | 0.274 | 13.0 | 23.3 |
| 18 | 7886 | 4.8 | 4.64 | 43.7 | 1263 | 29 | 1.29 | 21.7 | 0.081 | 0.600 | 36.7 | 48.0 |
| 1 | 2601 | 1.8 | 37.43 | 8.3 | 650 | 60 | 0.81 | 2.0 | 0.007 | 0.088 | 16.4 | 18.3 |
| 1 | 2282 | 3.0 | 36.43 | 10.4 | 770 | 60 | 0.82 | 2.3 | 0.006 | 0.110 | 17.5 | 20.8 |
| 13 | 4375 | 2.4 | 3.11 | 39.7 | 1556 | 40 | 0.47 | 23.5 | 0.013 | 0.127 | 23.7 | 24.7 |
| 9 | 4909 | 1.2 | 0.71 | 53.4 | 1894 | 36 | 0.57 | 7.4 | 0.040 | 0.290 | 23.1 | 26.4 |
| 20 | 3544 | 6.4 | 9.41 | 11.7 | 808 | 60 | 0.68 | 17.4 | 0.006 | 0.083 | 25.4 | 27.5 |
| 15 | 5022 | 5.6 | 11.76 | 50.1 | 1773 | 36 | 1.06 | 23.9 | 0.058 | 0.343 | 24.8 | 26.9 |
| 19 | 4120 | 3.0 | 0.83 | 38.2 | 1874 | 47 | 0.76 | 8.7 | 0.017 | 0.148 | 20.6 | 25.2 |
| 26 | 4258 | 6.0 | 8.83 | 16.3 | 792 | 46 | 0.45 | 4.4 | 0.009 | 0.074 | 21.5 | 27.9 |
| 24 | 3904 | 5.6 | 9.12 | 26.1 | 1270 | 46 | 0.32 | 12.5 | 0.007 | 0.108 | 21.3 | 22.3 |
| 4 | 6713 | 7.2 | 1.09 | 52.6 | 1883 | 36 | 0.58 | 22.8 | 0.041 | 0.249 | 25.9 | 27.1 |
| 11 | 2638 | 2.4 | 21.30 | 13.9 | 897 | 60 | 0.89 | 5.7 | 0.002 | 0.086 | 16.8 | 18.9 |
| 17 | 4163 | s.0 | 12.57 | 14.7 | 958 | 54 | 0.27 | 18.7 | 0.006 | 0.161 | 22.8 | 25.9 |

TABLE 4-continued

| | | | | | Responses | | | | | | |
|---|---|---|---|---|---|---|---|---|---|---|---|
| | pin | | Intern | Haake | Trq | Stab | MI- | Spencer | OPV | OPV | Elmendorf | |
| Trial | Flex | T-form | Haze | (slope) | Max | min | Stab. | Impact | dry | wet | MD | TD |
| 27 | 3971 | 4.8 | 15.17 | 21.9 | 1351 | 55 | 0.34 | 24.6 | 0.005 | 0.105 | 26.9 | 25.1 |
| 28 | 4833 | 4.8 | 2.19 | 30.6 | 1578 | 47 | 0.77 | 12.5 | 0.017 | 0.172 | 19.7 | 22.3 |
| 29 | 3794 | 5.6 | 4.53 | 31.8 | 1536 | 46 | 0.66 | 12.3 | 0.008 | 0.147 | 19.4 | 21.0 |
| 30 | 2954 | 6.4 | 6.37 | 29.0 | 1604 | 56 | 0.70 | 11.1 | 0.002 | 0.161 | 19.1 | 21.5 |
| 31 | 1657 | 1.2 | 2.15 | 32.2 | 1599 | 47 | — | 5.3 | 0.000 | 0.049 | 17.7 | 21.2 |

From analysis of the above data, the following determinations were made:

Internal Haze can be minimized by reducing the amorphous polyamide concentration, increasing the EVOH concentration, and increasing the semicrystalline polyamide concentration in the blend. Also, it was found that blends containing nylon-6 produce less internal haze than those containing copolymer nylon such as nylon-6/66, even though blends with nylon-6/66 process better than blends with nylon-6. But, when copolymer nylon such as nylon 6/66 is used in conjunction with an ionomer containing a softening ter-monomer, a less objectionable haze results than when the copolymer nylon is used with an ionomer without the softening ter-monomer.

OPV wet can be minimized by decreasing the semicrystalline polyamide concentration. Nevertheless, it was found that oxygen barrier properties at high humidity of EVOH/ amorphous polyamide blends are improved by the addition of semicrystalline nylon. OPV wet can also be minimized by increasing the ionomer concentration, this despite the fact that ionomer itself is known to be both hygroscopic and provide poor oxygen barrier properties. Employing copolymer nylon such as nylon 6/66 instead of nylon-6 in the blend resulted in better high-humidity oxygen barrier.

Thermoformability appears to be improved by employing copolymer nylon such as nylon-6/66 instead of nylon-6.

Thermoformability does not appear to be influenced by the concentration of EVOH semicrystalline nylon, amorphous nylon or ionomer. If the concentration of EVOH is high and the ionomer neutralization is high, thermoformability appears to improve. On the other hand, if the concentration of amorphous nylon is high and the ionomer neutralization is also high, thermoformability appears to be impaired.

Pinhole flex appears to be improved by employing copolymer nylon such as nylon 6/66 or by using ionomer containing softening ter-monomer such as one containing iso-butyl acrylate or n-butyl acrylate.

Thermal stability appears to be reduced when high concentrations of semicrystalline nylon are used.

Three-Component Example

To compare the effects on MI_Stab. of percent free-acid and melt flow, the melt-blends in Table 5 were prepared by first making the ionomer/polyamide blend and then melt-blending with the EVOH (32 mol % ethylene). MI_Stab. reported in Table 5 was measured as described above. In addition, up to 3 parts calcium stearate per hundred parts by weight of the EVOH/ionomer/polyamide blend was added to determine its effect. Some improvement in MI_Stab. is seen, particularly in the case of blends with higher free-acid levels, when the calcium stearate is added.

Further, films of the EVOH/ionomer/polyamide were coextruded or blow-molded with various BYNEL® coextrudable adhesive grades as the tie layer (50E571 in a polypropylene-tie layer-EVOH blend -tie layer-polypropylene five-layer, blow-molded bottle, and 41E557, 4104, and 41E558 in a HDPE-tie layer-EVOH blend three-layer blown film). All BYNEL® coextrudable adhesives are available from E. I. du Pont de Nemours and Company. A qualitative comparison of adhesion of the anhydride modified tie layer to the EVOH blends showed that Blend No. 1 and Blend No. 2 in Table 5 had poor adhesion, while Blend No. 3 had significantly better adhesion, almost equivalent to EVOH alone.

TABLE 5

| Blend No. | EVOH wt. % | Nylon-6 wt. % | Ionomer wt. % | Free-Acid wt. % | MI[10] of Ionomer/Polyamide | MI_Stab. |
|---|---|---|---|---|---|---|
| 1 | 70 | 9 | 21 | 12.0[11] | 2.0 | 0.52 |
| 2 | 70 | 4 | 26 | 7.4[12] | 4.3 | 0.58 |
| 3 | 70 | 4 | 26 | 4.7[13] | 11.9 | 0.78 |

[10]Melt index (MI) of ionomer/polyamide blends measured essentially per ASTM D-1238, condition E (grams of ionomer exiting a 0.0823 inch orifice in ten minutes (gm/10 min) with 2160 gram weight applied force) except at a temperature of 230° C.
[11]Ethylene/20% MAA, 40% zinc neutralized.
[12]Ethylene/12% MAA, 38% zinc neutralized.
[13]Ethylene/11% MAA, 57% zinc neutralized.

I claim:
1. A composition comprising a melt-blend of:
   a. about 40 to about 92 weight percent ethylene vinyl alcohol,
   b. about 1 to about 30 weight percent amorphous polyamide, such amorphous polyamide being a polyamide lacking an endotherm crystalline melting peak in a differential scanning calorimeter measurement made in accord with ASTM D-3417 using a 10° C. per minute heating rate,
   c. about 2 to about 30 weight percent semicrystalline polyamide, and
   d. about 5 to about 30 weight percent ionomer, said ionomer being derived from a direct copolymer of ethylene and α,β-ethylenically-unsaturated $C_3$–$C_8$ carboxylic acid, the weight percentages of components a, b, c, and d adding to 100%.

2. The composition of claim 1 comprising a melt-blend of:
   a. about 60 to about 80 weight percent ethylene vinyl alcohol,
   b. about 5 to about 25 weight percent amorphous polyamide,
   c. about 5 to about 20 weight percent semicrystalline polyamide, and
   d. about 10 to about 25 weight percent ionomer, the weight percentages of components a, b, c, and d adding to 100%.

3. The composition of claim 1 comprising a melt-blend of:
   a. about 50 to about 75 weight percent ethylene vinyl alcohol,
   b. about 10 to about 20 weight percent amorphous polyamide,
   c. about 10 to about 15 weight percent semicrystalline polyamide, and
   d. about 5 to about 15 weight percent ionomer, the weight percentages of components a, b, c, and d adding to 100%.

4. The composition of claim 1 further comprising 0.05 to 5.0% by weight of a hindered phenol antioxidant of the total melt-blend of ethylene vinyl alcohol, amorphous polyamide, semicrystalline polyamide and ionomer.

5. The composition of claim 4 wherein the hindered phenol antioxidant is present in a weight percent of 0.1 to 1% by weight of the total melt-blend of ethylene vinyl alcohol, amorphous polyamide, semicrystalline polyamide and ionomer.

6. The composition of claims 1, 2 or 3 wherein the ethylene vinyl alcohol has a copolymerized ethylene content of about 20 to about 50 mole %, and a degree of saponification of at least 90%.

7. A composition comprising a melt-blend of:
   a. about 60 to about 90 weight percent ethylene vinyl alcohol, and
   b. about 10 to about 40 weight percent of an ionomer/semicrystalline polyamide blend wherein the ionomer comprises about 50 to 90 weight percent of the ionomer/polyamide blend and the ionomer free-acid level is less than about 7 wt. %.

8. A composition comprising a melt-blend of:
   a. about 65 to about 85 weight percent ethylene vinyl alcohol, and
   b. about 15 to about 35 weight percent of an ionomer/semicrystalline polyamide blend wherein the ionomer comprises about 50 to 90 weight percent of the ionomer/polyamide blend and the ionomer free-acid level is less than about 7 wt. %.

9. A composition comprising a melt-blend of:
   a. about 70 to about 80 weight percent ethylene vinyl alcohol, and
   b. about 20 to about 30 weight percent of an ionomer/semicrystalline polyamide blend wherein the ionomer comprises about 50 to 90 weight percent of the ionomer/polyamide blend and the ionomer free-acid level is less than about 7 wt. %.

10. The composition of claims 7, 8, or 9 wherein the ionomer comprises 75 to 90 percent of the ionomer/polyamide blend.

11. The composition of claims 7, 8, or 9 wherein the free-acid level is less than about 5.

12. The composition of claims 7, 8, or 9 wherein the melt index of the ionomer/polyamide blend is greater than about 3, the melt index being measured per ASTM D-1238, condition E (grams of ionomer exiting a 0.0823 inch orifice in ten minutes (gm/10min) with 2160 gram weight applied force at a temperature of 230° C.

13. The composition of claim 12 wherein the melt index is greater than about 5.

14. The composition of claim 13 wherein the melt index is about 10 or greater.

* * * * *